(12) United States Patent
Urata et al.

(10) Patent No.: US 8,457,465 B1
(45) Date of Patent: Jun. 4, 2013

(54) OPTICAL ATTENUATION SYSTEM

(75) Inventors: Ryohei Urata, Sunnyvale, CA (US); Hong Liu, Palo Alto, CA (US); Zuowei Shen, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/474,305

(22) Filed: May 17, 2012

(51) Int. Cl.
*G02B 6/00* (2006.01)
(52) U.S. Cl.
USPC .......................................................... 385/140
(58) Field of Classification Search
USPC ........... 385/80, 147, 88, 89, 92, 93, 135–139, 385/140, 14–16
See application file for complete search history.

(56) References Cited

U.S. PATENT DOCUMENTS

| 5,633,974 | A * | 5/1997 | Chia ............................ 385/140 |
| 6,295,272 | B1 * | 9/2001 | Feldman et al. .............. 370/210 |
| 2005/0031357 | A1 * | 2/2005 | Soto et al. ...................... 398/198 |
| 2007/0041085 | A1 * | 2/2007 | Nakano et al. ............ 359/341.42 |
| 2007/0071450 | A1 * | 3/2007 | Schatz et al. ................... 398/162 |
| 2012/0263460 | A1 * | 10/2012 | Movassaghi et al. ........... 398/38 |

* cited by examiner

*Primary Examiner* — Akm Enayet Ullah
(74) *Attorney, Agent, or Firm* — Honigman Miller Schwartz and Cohn LLP

(57) ABSTRACT

An optical attenuation system that includes first and second attenuators providing different attenuations of corresponding received optical signals. The first attenuator receives an optical signal emitted by a transmitter of a first transceiver and delivers the received optical signal to a receiver of a second transceiver. The second attenuator receives an optical signal emitted by a transmitter of the second transceiver and delivers the received optical signal to a receiver of the first transceiver. A method may include determining first and second optical attenuations for the first and second attenuators, respectively, and for at least one attenuator, arranging a first fiber optic cable having a first core size in series with a second fiber optic cable having a second core size to provide the determined corresponding optical attenuation.

24 Claims, 8 Drawing Sheets

OPTICAL ATTENUATION SYSTEM

TECHNICAL FIELD

This disclosure relates to in-line optical attenuation to provide interoperability between two optical interfaces.

BACKGROUND

Optical components are generally used for telecommunication and data transfers over networks. Variable in-line optical attenuators (also referred to as adjustable in-line optical attenuators) may provide fixed control of optical power levels of an optical signal in a controlled manner when placed in its optical path.

Generally, variable (or different levels of) in-line attenuation can be achieved in a variety of ways. One way is to attenuate the output light from one optical fiber with a filter or a doped fiber, which then enters a second optical fiber to produce the attenuated light. The amount of attenuation is dependent on the density of the filter or amount of doping of the fiber, which can be changed across different parts to achieve different levels of attenuation.

SUMMARY

Optical interoperability between two different optical interfaces, first and second transceivers, can be achieved using asymmetric variable in-line optical attenuation which can shift the dynamic range of optical power in each direction independently. Unlike symmetric in-line optical attenuation, which shifts the transmitter optical power ranges of both transceivers by the same amount, asymmetric in-line optical attenuation can shift the transmitter optical power ranges of the two transceivers by different amounts to alleviate receiver overload issues without sacrificing the optical link budget for one or both transceivers.

One aspect of the disclosure provides an optical attenuation system that includes first and second attenuators providing different attenuations of corresponding received optical signals. The first attenuator receives an optical signal emitted by a transmitter of a first transceiver and delivers the received optical signal to a receiver of a second transceiver. The second attenuator receives an optical signal emitted by a transmitter of the second transceiver and delivers the received optical signal to a receiver of the first transceiver.

Implementations of the disclosure may include one or more of the following features. The attenuators may provide attenuations for: 1) preventing receiver saturation and/or 2) tuning an optical link budget, for example, by preserving a positive optical link budget. In some implementations, at least one of the attenuators includes at least two fiber optic cables having different core sizes arranged in series to provide an attenuation that prevents receiver saturation by shifting a transmitter optical power range of the corresponding transmitter below an optical modulation amplitude and/or average received power corresponding to a receiver overload of the corresponding receiver. Additionally or alternatively, at least one of the attenuators may include at least two fiber optic cables having different core sizes arranged in series to provide an attenuation that tunes an optical link budget. The attenuation may shift the transmitter optical power range by a threshold power difference that prevents receiver saturation and/or maintains an optical link budget needed for error free operation (e.g., a positive optical budget).

Several attenuation configurations are possible. In a first configuration, both attenuators provide corresponding attenuations that prevent receiver saturation. In a second configuration, both attenuators provide corresponding attenuations that preserve a positive optical link budget. In a third configuration, one of the attenuators provides an attenuation that prevents receiver saturation, while the other attenuator provides an attenuation that preserves a positive optical link budget. Other configurations are possible as well.

In some implementations, at least one attenuator includes a first fiber optic cable, having a first core size, arranged to receive light emitted from the corresponding transmitter and a second fiber optic cable, having a second core size smaller or larger than the first core size, arranged to receive all or some light propagated by the first fiber optic cable for propagation to the corresponding receiver. When the second fiber optic cable has a second core size smaller than the first core size, the second fiber optic cable may receive only a fraction of the light propagated by the first fiber optic cable. In the other case, when the second fiber optic cable has a second core size larger than the first core size, the second fiber optic cable may receive all of the light propagated by the first fiber optic cable.

Another aspect of the disclosure provides a method of optical attenuation that includes determining first and second optical attenuations and arranging at least two fiber optic cables having different core sizes in series to provide at least one of the determined attenuations. The first attenuation is for a first attenuator receiving an optical signal emitted by a transmitter of a first transceiver and delivering the received optical signal to a receiver of a second transceiver. The second attenuation is for a second attenuator receiving an optical signal emitted by a transmitter of the second transceiver and delivering the received optical signal to a receiver of the first transceiver.

In some implementations, the method includes determining at least one of the attenuations to prevent receiver saturation by shifting a transmitter optical power range of a corresponding transmitter below an optical modulation amplitude corresponding to a receiver overload of a receiver receiving an optical signal emitted by the transmitter. The method may include arranging at least two fiber optic cables having different core sizes in series to provide the attenuation that prevents receiver saturation.

In some implementations, the method includes determining at least one of the attenuations to tune an optical link budget. The method may include arranging at least two fiber optic cables having different core sizes in series to provide the attenuation that tunes the optical link budget. Moreover, the method may include determining the optical attenuation to shift the transmitter optical power range by a threshold power difference that maintains a positive optical link budget.

To provide the attenuation(s), the method may include arranging a first fiber optic cable having a first core size to receive light emitted from the transmitter and arranging a second fiber optic cable having a second core size smaller or larger than the first core size to receive at least some light propagated by the first fiber optic cable for propagation to the receiver. The method may include arranging the second fiber optic cable to receive a fraction of the light propagated by the first fiber optic cable for propagation to the receiver, when the second fiber optic cable has a second core size smaller than the first core size. The method may also include arranging the second fiber optic cable to receive all of the light propagated by the first fiber optic cable for propagation to the receiver, when the second fiber optic able has a second core size larger than the first core size.

In yet another aspect, a method of optical attenuation includes determining a first optical attenuation for a first attenuator and determining a second optical attenuation for a second attenuator. The first attenuator receives an optical signal emitted by a transmitter of a first transceiver and delivers the received optical signal to a receiver of a second transceiver. The first optical attenuation is determined to: 1) shift a transmitter optical power range of the first transceiver transmitter below a threshold power (e.g., below an optical modulation amplitude or average optical power) corresponding to a receiver overload of the second transceiver receiver and/or 2) tune a corresponding optical link budget.

The second attenuator receives an optical signal emitted by a transmitter of the second transceiver and delivers the received optical signal to a receiver of the first transceiver. The second optical attenuation is determined to: 1) shift a transmitter optical power range of the first transceiver transmitter below a threshold power (e.g., below an optical modulation amplitude or average optical power) corresponding to a receiver overload of the second transceiver receiver and/or 2) tune a corresponding optical link budget.

In some implementations, the method includes determining an optical attenuation of one or both paths to shift the corresponding transmitter optical power range by a threshold optical modulation amplitude difference that maintains a positive optical link budget.

For at least one attenuator, the method may include arranging a first fiber optic cable having a first core size in series with a second fiber optic cable having a second core size. Each fiber optic cable may have a difference core size. Moreover, the first and second attenuators may provide different optical attenuations of the corresponding received optical signals.

For, at least one attenuator, the method may include arranging the first fiber optic cable to collect light emitted from the corresponding transmitter and arranging the second fiber optic cable, having a second core size smaller than the first core size of the transmitter, to receive at least some light propagated by the first fiber optic cable for propagation to the corresponding receiver. The method may include arranging the second fiber optic cable to receive a fraction of the light propagated by the first fiber optic cable for propagation to the receiver.

Additionally or alternatively, for at least one attenuator, the method may include arranging the first fiber optic cable to collect light emitted from the corresponding transmitter and arranging the second fiber optic cable, having a second core size larger than the first core size of the transmitter, to collect the light propagated by the first fiber optic cable for propagation to the corresponding receiver.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
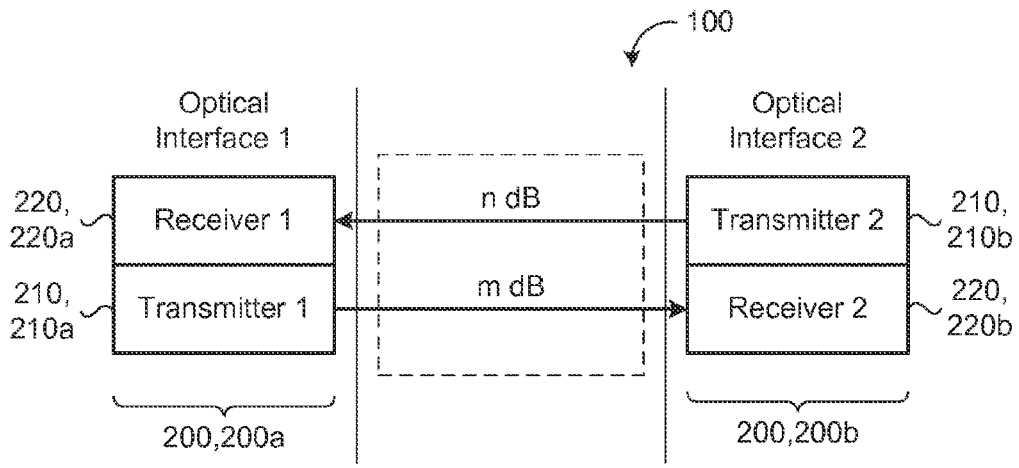
FIG. 1 is a schematic view of an exemplary asymmetric variable in-line optical attenuation system between two optical interfaces.
Figure 2:
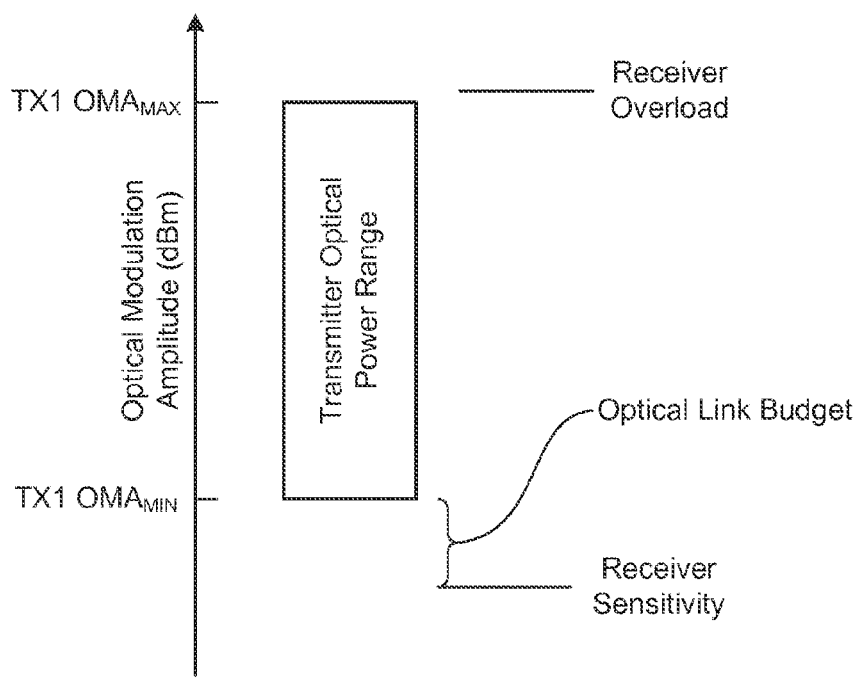
FIG. 2 is a graphical view of an exemplary transmitter optical power range with respect to an exemplary receiver overload and an exemplary receiver sensitivity for an optical interface.

Referring to FIGS. 1 and 2, in some implementations, an optical attenuation system 100 provides asymmetric variable in-line optical attenuation that allows optical interoperability between first and second optical transceivers 200, 200a, 200b having different transmitter optical power ranges, receiver sensitivity, and/or receiver overload.

An optical transceiver 200 includes an optical transmitter 210 and an optical receiver 220, which are generally combined and share common circuitry and/or a single housing. The optical transmitter 210 may have an optical power range defined by a minimum optical modulation amplitude and a maximum optical modulation amplitude (e.g., both measured in dBm—optical power referenced to 1 milliwatt). The optical receiver 220 may have a receiver sensitivity (an optical modulation amplitude measured in dBm) and a receiver overload (an optical modulation amplitude measured in dBm). A difference between the minimum transmitter optical modulation amplitude of a transmitter 210 and the receiver sensitivity of a corresponding receiver 220 receiving optical signals from the transmitter 210 is an optical link budget. In general, the optical link budget should be positive for the receiver 220 to receive data with high fidelity. A receiver 220 reaches saturation, and therefore cannot receive data, when the received input power exceeds a maximum allowable input power. This property can be an important concern for relatively short distances between two pieces of communicating equipment.

A data communication system may use on-off keying in an optical signal to covey digital information. On-off keying (OOK) is a form of amplitude-shift keying (ASK) modulation that represents digital data as the presence or absence of a carrier wave. For example, the presence of a carrier for a specific duration can represent a binary one, while its absence for the same duration can represent a binary zero. To maintain optical interoperability between two optical transceivers 200a, 200b in a data communication system employing on-off keying, the following parameters may need to be compatible: 1) minimum transmitter optical modulation amplitude; 2) maximum transmitter optical modulation amplitude; 3) receiver sensitivity; and 4) receiver overload.

Figure 3:
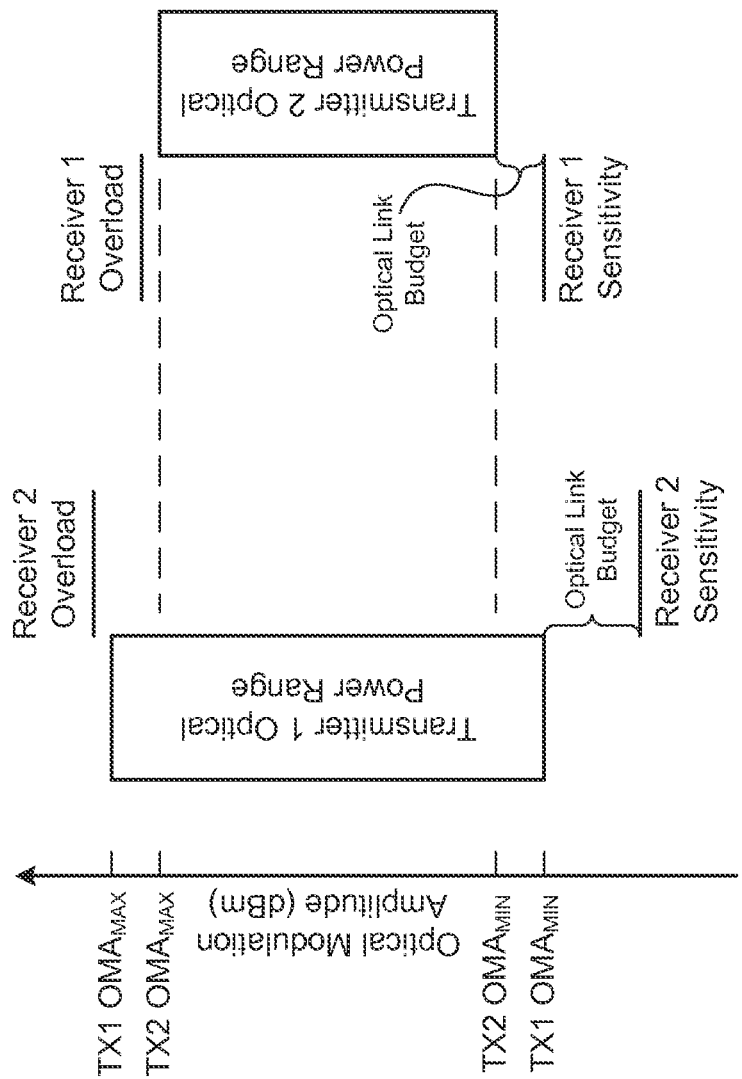
FIG. 3 is a graphical view of optical interoperability between exemplary first and second optical interfaces.

Referring to FIG. 3, in some implementations, when interconnecting two different optical interfaces 200, i.e., optical transceivers 200a, 200a, an offset or incongruency between the corresponding transmitter optical power ranges, receiver sensitivity, and/or receiver overload may result in degraded receiver performance. For example, the receiver overload of a receiver 220 of one optical transceiver 200 may be below the maximum transmitter optical modulation amplitude of a corresponding transmitter 210. When the receiver 220 receives an optical modulation amplitude greater than its receiver overload, the receiver 220 may become saturated due to signals outside of a linear range of a photodetector or other circuitry, such as a transimpedence amplifier, of the receiver 220. In some examples, the receiver sensitivity of a receiver 220 may be above the minimum transmitter optical modulation amplitude of a corresponding transmitter 210. When the receiver 220 receives an optical modulation amplitude smaller than its receiver sensitivity, the receiver 220 may be unable to generate the received signal with high fidelity (i.e., have too many bit errors).

Figure 4:
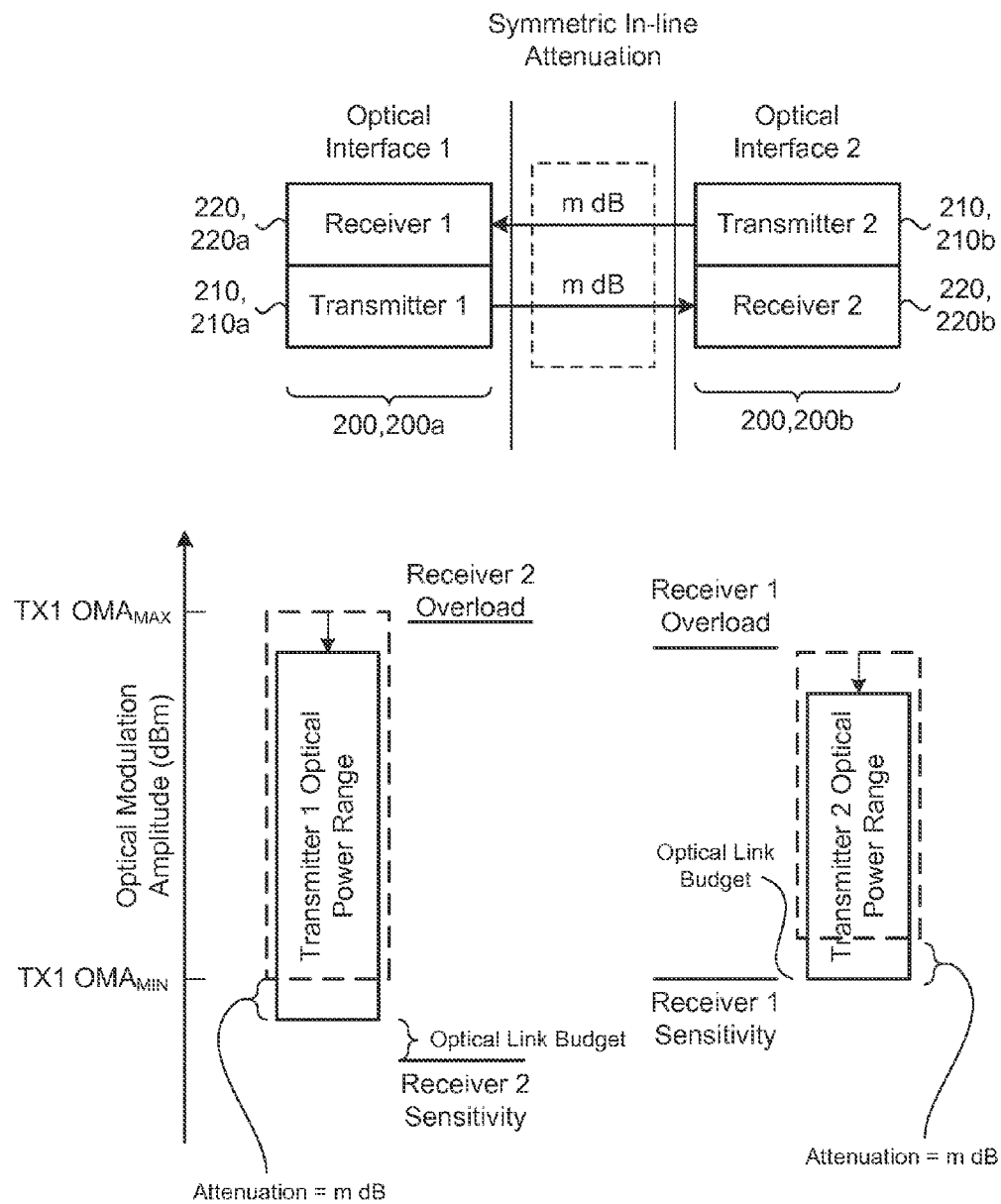
FIG. 4 is a schematic view of an exemplary symmetric optical attenuation between two optical interfaces.

Referring to FIG. 4, when symmetrical in-line optical attenuation is used between the first and second transceivers 200a, 200b to solve a receiver overload issue at the receiver 220b of the second transceiver 200b (receiver 2) for optical signals received from the transmitter 210a of the first transceiver 200a (transmitter 1), the transmitter optical modulation amplitude ranges for the transmitters 210a, 210b for both transceivers 200a, 200b are shifted equally, such as by m dB. Moreover, the optical link budget can be adversely affected due to a smaller minimum transmitter optical modulation amplitude received at the first transceiver receiver 220a (receiver 1 in transceiver 1). For optical signals sent from the second transceiver transmitter 210b (transmitter 2 in transceiver 2) to the first transceiver receiver 220a (receiver 1 in transceiver 1), the optical link budget could be negative, which may result in degradation of signal quality.

Figure 5:
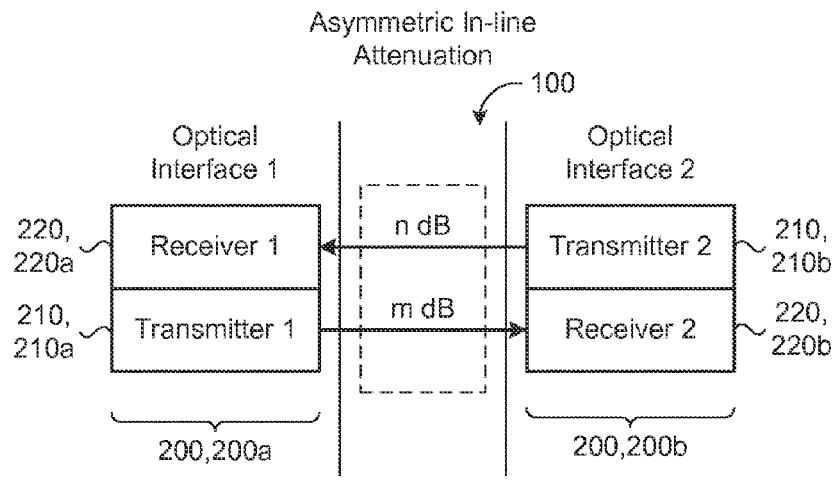
FIG. 5 is a schematic view of exemplary asymmetric optical attenuation between two optical interfaces.
Figure 5:
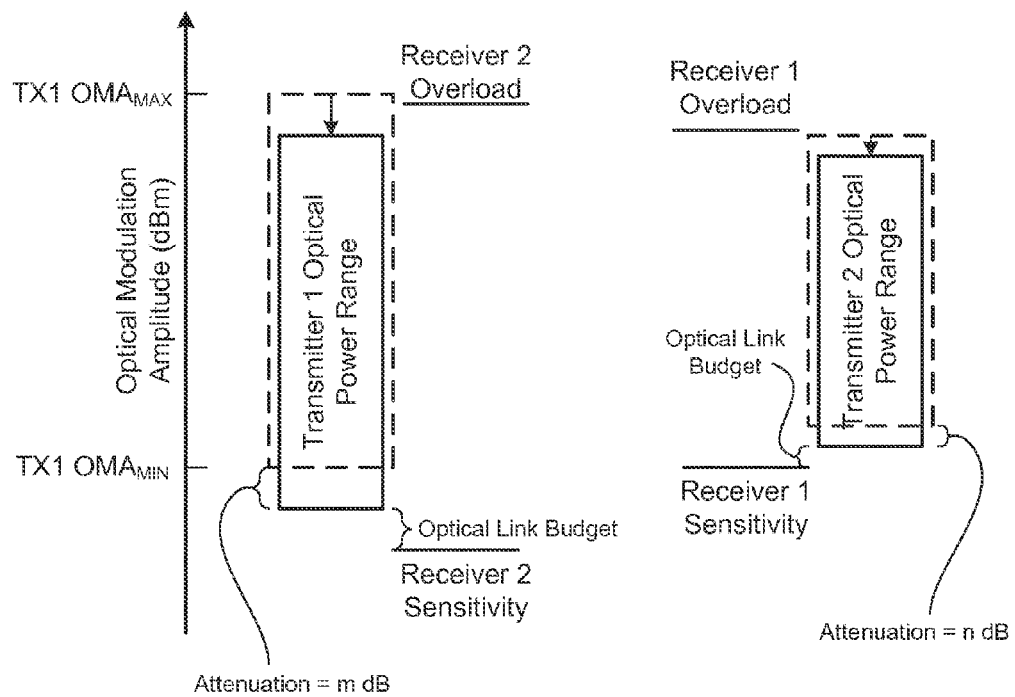

Referring to FIG. 5, when asymmetric in-line optical attenuation is used between the first and second transceivers 200a, 200b, the optical attenuation is different for both directions of optical communication. In the example shown, a first optical attenuation of m dB can be used for optical signals sent from the first transceiver transmitter 210a (transmitter 1) to the second transceiver receiver 220b (receiver 2 to meet the receiver overload requirements of the second transceiver receiver 220b (receiver 2). The first optical attenuation shifts the transmitter optical power range of the first transceiver transmitter 210a (transmitter 1) below an optical modulation amplitude or an average optical power corresponding to a receiver overload of the second transceiver receiver 220b (receiver 2).

A second optical attenuation of n dB can be used for optical signals sent from the second transceiver the transmitter 210b (transmitter 2) to the first transceiver receiver 220a (receiver 1) to meet the receiver overload requirements of the first transceiver receiver 210a (receiver 1). The second optical attenuation shifts the transmitter optical power range of the second transceiver the transmitter 210b (transmitter 2) below an optical modulation amplitude or an average optical power corresponding to a receiver overload of the first transceiver receiver 220a (receiver 1). Additionally, or alternatively, if there is no receiver overload issue for the first transceiver receiver 220a (receiver 1), the second optical attenuation of n dB can be used to preserve the optical link budget. In the example shown, the first optical attenuation is larger than the second optical attenuation; however, any appropriate attenuation may be used for either of the optical attenuations to satisfy optical interoperability between the first and second optical interfaces (transceivers) 200a, 200b.

Figure 6:
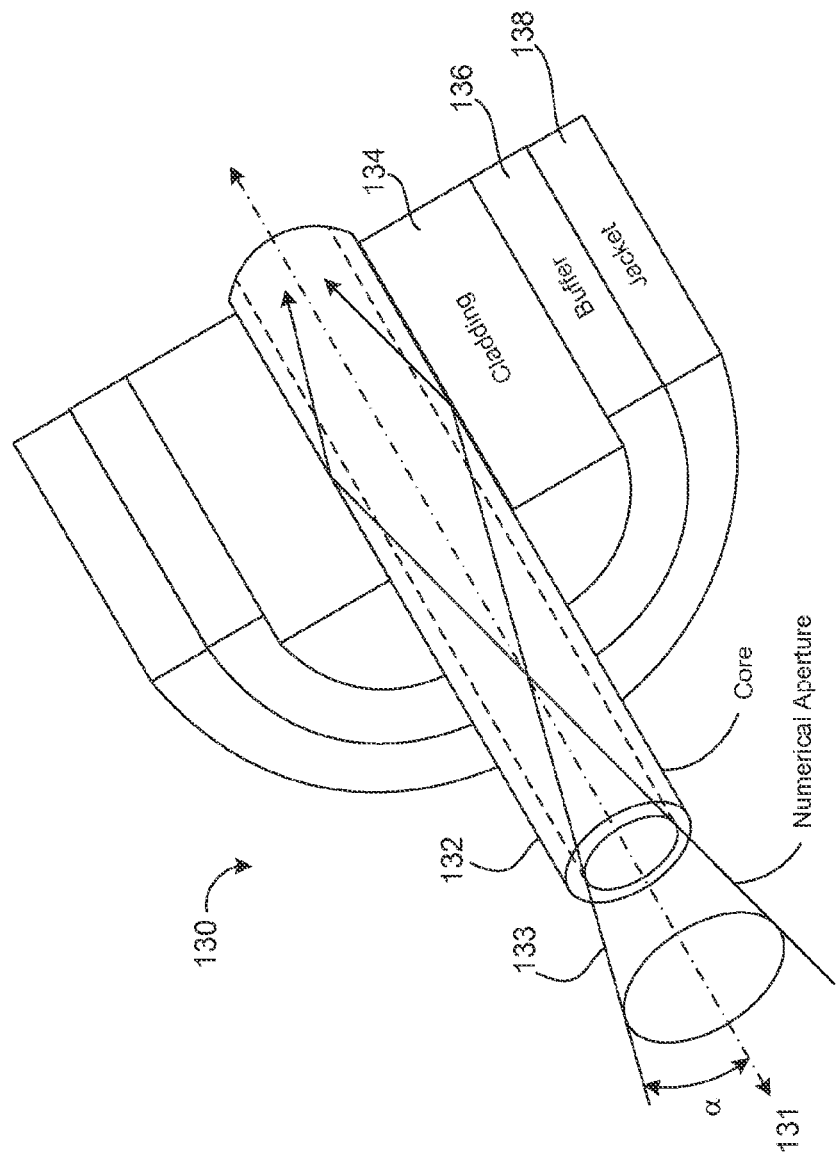
FIG. 6 is a perspective partial section view of a fiber optic cable.

Referring to FIG. 6, a fiber optic cable 130 includes a core 132, generally made of glass or plastic, that guides received light or signals. Cladding 134 surrounds the core 132 and traps the received light within the core 132 and guides the light along the core 132. The fiber optic cable 130 may include a buffer 136 around the cladding 134, as a protective layer, and a jacket 138 around the cladding 134, as a second protective layer, which may include pulling strands (e.g., nylon strands) for pulling the fiber optic cable 130 during installation without damaging the core 132.

In some implementations, the fiber optic cable 130 will only propagate light that enters the core 132 within an acceptance cone 133. A half-angle of the acceptance cone 133, measured from a core center axis 131 is the acceptance angle, or numerical aperture, α of the fiber optic cable 130, which is the maximum angle at which the core 132 can receive and propagate light. The numerical aperture α can be expressed as the square root of the squared refractive index $n_1$ of the core 132 minus the squared refractive index $n_2$ of the cladding 134.

$$\alpha = \sqrt{n_1^2 - n_2^2} \qquad (1)$$

Figure 7:
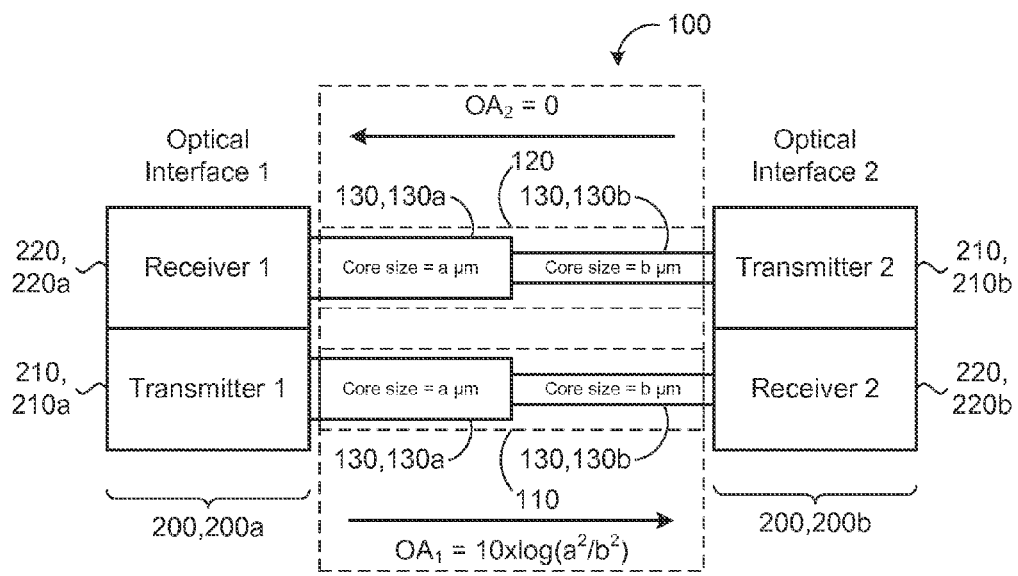
FIGS. 7 and 8 are schematic views of exemplary asymmetric optical attenuation between two optical interfaces using multiple fiber optic cables of different core sizes arranged in series to provide optical interoperability.
Figure 8:
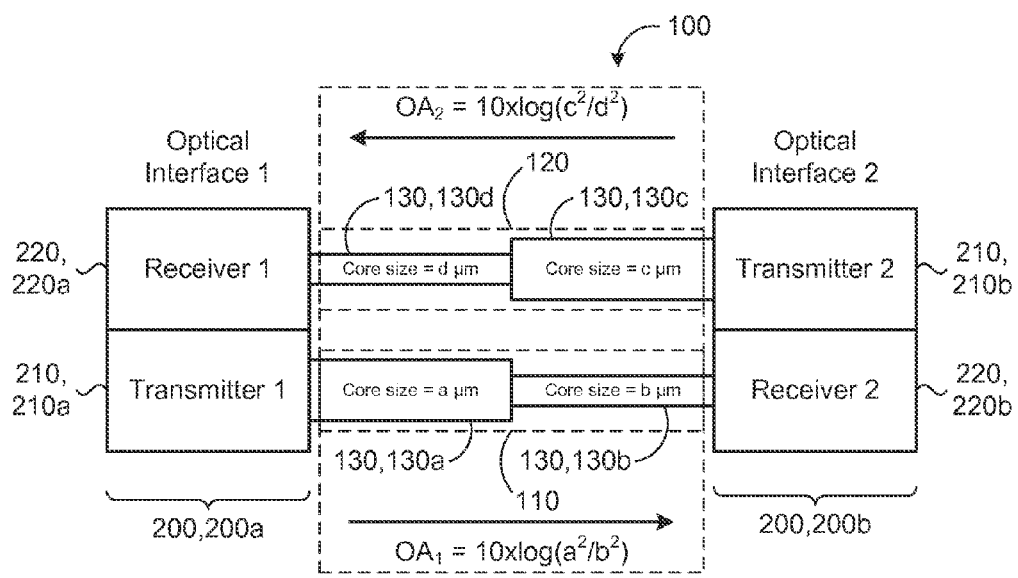

Referring to FIGS. 7 and 8, in some implementations, the optical attenuation system 100 includes first and second attenuators 110, 120, each providing variable attenuation. The first attenuator 110 provides attenuation between the first transceiver transmitter 210a (transmitter 1) and the second transceiver receiver 220b (receiver 2). The second attenuator 120 provides attenuation between the second transceiver transmitter 210b (transmitter 2) and the first transceiver receiver 210a (receiver 1). Each attenuator 110, 120 may be independently configured and operated with respect to the other. An amount of attenuation for each attenuator 110, 120 can be set by assembling in series between the corresponding transmitter 210 and the corresponding receiver 220 an arrangement of fiber optic cables 130 having different core sizes. Each fiber optic cable 130 can be connected to another using a fiber optic cable connector or by splicing (e.g., fusion splicing).

When arranging fiber optical cables 130 of different core sizes in series to attain a particular optical attenuation OA for an attenuator 110, 120, the acceptance angle, or numerical aperture, α of the fiber optic cables 130 may need consideration for the connection therebetween. In some cases, a difference in core sizes a, b of respective first and second fiber optic cables 130a, 130b may be greater than a threshold difference, such that joining the two fiber optic cables 130a, 130b results in some light transmitted from the first fiber optic cable 130a not being accepted by the second fiber optic cable 130b, by travelling outside of the acceptance angle α of the second fiber optic cable 130b (and thus outside the acceptance cone 133).

Attenuation fiber optics, also known as transmission loss, is generally the reduction in intensity of the light beam (or signal) from a first location to a second location. Optical attenuation (OA) can be expressed as:

$$OA = 10 \times \log_{10}\left(\frac{\text{Input Intensity}}{\text{Output Intensity}}\right) \qquad (2)$$

When light propagates from a first fiber optic cable 130a to a second fiber optic cable 130b, the percentage of light coupled into the second fiber optic cable 130b is roughly proportional to the area of its fiber core size. As a result, the optical attenuation from the first transceiver transmitter 210a (transmitter 1) to the second transceiver receiver 220b (receiver can be determined as:

$$OA = 10 \times \log_{10}\left(\frac{a^2}{b^2}\right) \qquad (3)$$

here the optical signal emitted from the first transceiver transmitter 210a (transmitter 1) travels initially through the first fiber optic cable 130a having a core diameter of a μm and then into the second fiber optic cable 130b having a core diameter of b μm. Other sources of optical coupling losses may be accounted for in determining the optical attenuation and may include a quantification of how light diffracts out of an end of the fiber optic cable 130 and/or which modes are excited by the received light.

In the example shown in FIG. 7, the optical attenuation system 100 between the first and second transceivers 200a, 200b includes an arrangement of a first fiber optic cable 130a having a first core size of a μm and a second fiber optic cable 130b having a second core size of b μm connected in series, where a is greater than b. For both attenuators 110, 120, the first fiber optic cable 130a extends from the first transceiver 200a and the second fiber optic cable 130b extends from the second transceiver 200b, with both meeting or connecting therebetween. In this example, a first optical attenuation $OA_1$ for an optical signal emitted from the first transceiver transmitter 210a (transmitter 1) to the second transceiver receiver 220b (receiver 2) can be determined using equation 3, since the optical signal travels initially through the first fiber optic cable 130a having a core diameter of a μm and then into the second fiber optic cable 130b having a core diameter of b μm. A second optical attenuation $OA_2$ is zero (or nearly zero) for an optical signal emitted from the second transceiver transmitter 210b (transmitter 2) to the first transceiver receiver 220a (receiver 1), since the optical signal emitted from the second transceiver transmitter 210b (transmitter 2) travels initially through the second fiber optic cable 130b having a core diameter of b μm and then into the first fiber optic cable 130a having core diameter of a μm, which is greater than b, thus capturing all (or nearly all) of the propagated signal with its acceptance cone 133 (assuming a proper connection therebetween).

Referring to FIG. 8, in some implementations, depending on the optical dynamic range and receiver characteristics of the first and second transceivers 200a, 200b, the attenuation system 100 may include various arrangements of fiber optic cables 130 with different core sizes connected in series to obtain an appropriate shift in optical dynamic range to make the two optical interfaces compatible. In the example shown, the first attenuator 110 provides a first optical attenuation $OA_1$ between the first transceiver transmitter 210a (transmitter 1) and the second transceiver receiver 220b (receiver 2) by including a first fiber optic cable 130a having a first core size of a μm connected in series with a second fiber optic cable 130b having a second core size of b μm, from the first transceiver transmitter 210a to the second transceiver receiver 220b, where a is greater than b. The second attenuator 120 provides a second optical attenuation $OA_2$ between the second transceiver transmitter 210b (transmitter 2) and the first transceiver receiver 210a (receiver 1) by including a third fiber optic cable 130c having a third core size of c μm connected in series with a fourth fiber optic cable 130d having a fourth core size of d μm, from the second transceiver transmitter 210b to the first transceiver receiver 220a, where c is greater than d. The first and second optical attenuations $OA_1$, $OA_2$ can be determined using equation 3. This arrangement provides asymmetric in-line optical attenuation that accommodates the optical interfaces in both directions of communication.

For multi-mode fiber (MMF), typical fiber core sizes include 80 μm, 62.5 μm, and 50 μm. Table 1 provides an exemplary arrangement of combinations of fiber core sizes and corresponding optical coupling losses, or attenuation.

TABLE 1

| Core Size | -> 80 μm | -> 62.5 μm | -> 50 μm |
| --- | --- | --- | --- |
| 80 μm -> | 0 dB | 2.1 dB | 4.1 dB |
| 62.5 μm -> | 0 dB | 0 dB | 1.9 dB |
| 50 μm -> | 0 dB | 0 dB | 0 dB |

In some implementations, three or more fiber optical cables 130 of different core sizes may need to be connected in series to obtain a particular optical attenuation. This may be beneficial when a difference in core sizes a, b of respective first and second fiber optic cables 130a, 130b is greater than a threshold operability difference or a threshold connectability difference, and having a third fiber optic cable 130c, having a core size c between a and b, therebetween in series provides manageably differences in core sizes. Additionally or alternatively, having multiple coupling losses at connections between fiber optic cables 130 may be necessary to provide a certain attenuation that shifts the optical dynamic range by a certain amount that makes two optical interfaces compatible.

Figure 9:
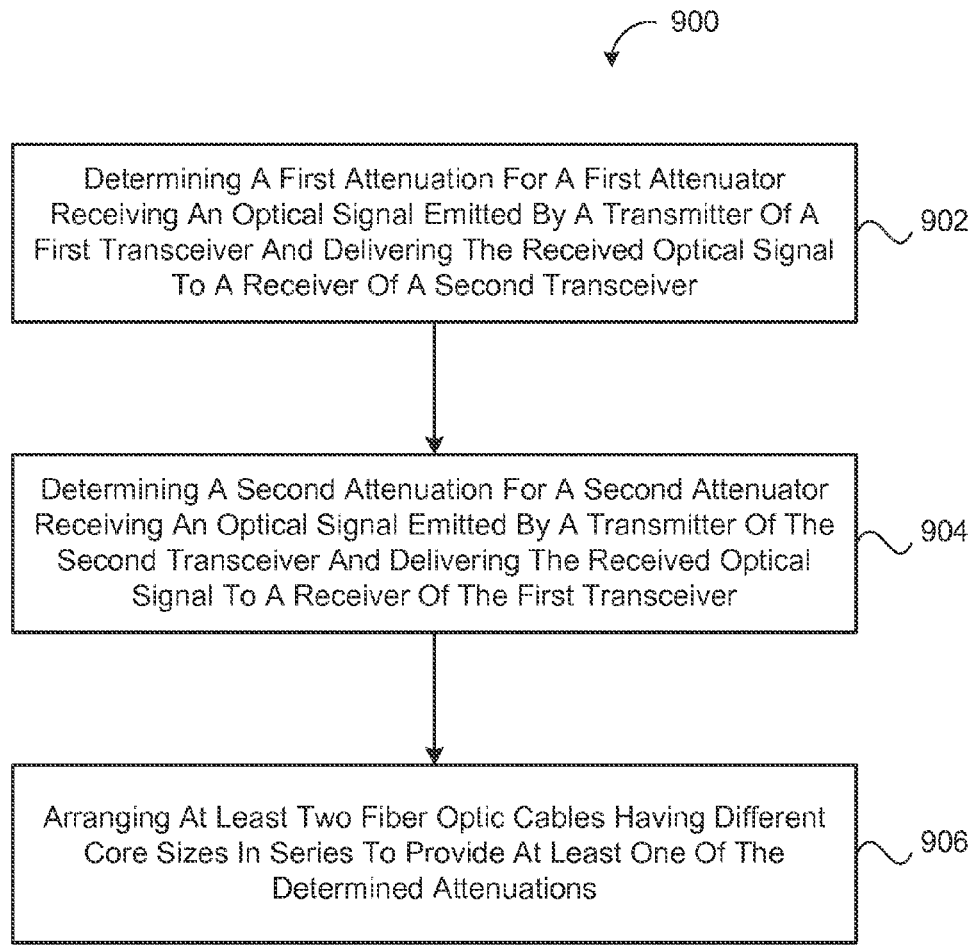
FIG. 9 provides an exemplary arrangement of operations for a method of attenuating an optical signal between first and second transceivers.

FIG. 9 provides an exemplary arrangement 900 of operations for a method optical attenuation that includes determining 902 a first attenuation $OA_1$ for a first attenuator 110 receiving an optical signal emitted by a transmitter 210a of a first transceiver 200a and delivering the received optical signal to a receiver 220b of a second transceiver 200b. The method includes determining 904 a second attenuation $OA_2$ for a second attenuator 120 receiving an optical signal emitted by a transmitter 210b of the second transceiver 200b and delivering the received optical signal to a receiver 220a of the first transceiver 200a. The method also includes arranging 906 at least two fiber optic cables 130 having different core sizes in series to provide at least one of the determined attenuations $OA_1$, $OA_2$.

In some implementations, the method includes determining at least one of the attenuations $OA_1$, $OA_2$ to prevent receiver saturation by shifting a transmitter optical power range of a corresponding transmitter 210a, 210b below an optical modulation amplitude corresponding to a receiver overload of a receiver 220a, 220b receiving an optical signal emitted by the transmitter 210a, 210b. The method may include arranging at least two fiber optic cables 130 having different core sizes in series to provide the attenuation $OA_1$, $OA_2$ that prevents receiver saturation.

In some implementations, the method includes determining at least one of the attenuations $OA_1$, $OA_2$ to tune an optical link budget. The method may include arranging at least two fiber optic cables 130 having different core sizes in series to provide the attenuation $OA_1$, $OA_2$ that tunes the optical link budget. Moreover, the method may include determining the optical attenuation $OA_1$, $OA_2$ to shift the transmitter optical power range by a threshold power difference (e.g., a threshold optical modulation amplitude difference) that maintains a positive optical link budget.

To provide the attenuation(s) $OA_1$, $OA_2$, the method may include arranging a first fiber optic cable 130a having a first core size to receive light emitted from the transmitter 210a, 210b and arranging a second fiber optic cable 130b having a second core size smaller or larger than the first core size to receive at least some light propagated by the first fiber optic cable 130a for propagation to the receiver 220a, 220b. The method may include arranging the second fiber optic cable 130b to receive a fraction of the light propagated by the first fiber optic cable 130a for propagation to the receiver 220a, 220b, when the second fiber optic cable 130b has a second core size smaller than the first core size. The method may also include arranging the second fiber optic cable 130b to receive all of the light propagated by the first fiber optic cable 130a for propagation to the receiver 220a, 220a, when the second fiber optic cable 130b has a second core size larger than the first core size. When the second core size is smaller than the first core size, the optical attenuation OA can be determined using equation 3. When the second core size is larger than the first core size the optical attenuation OA is zero (or nearly zero).

Figure 10:
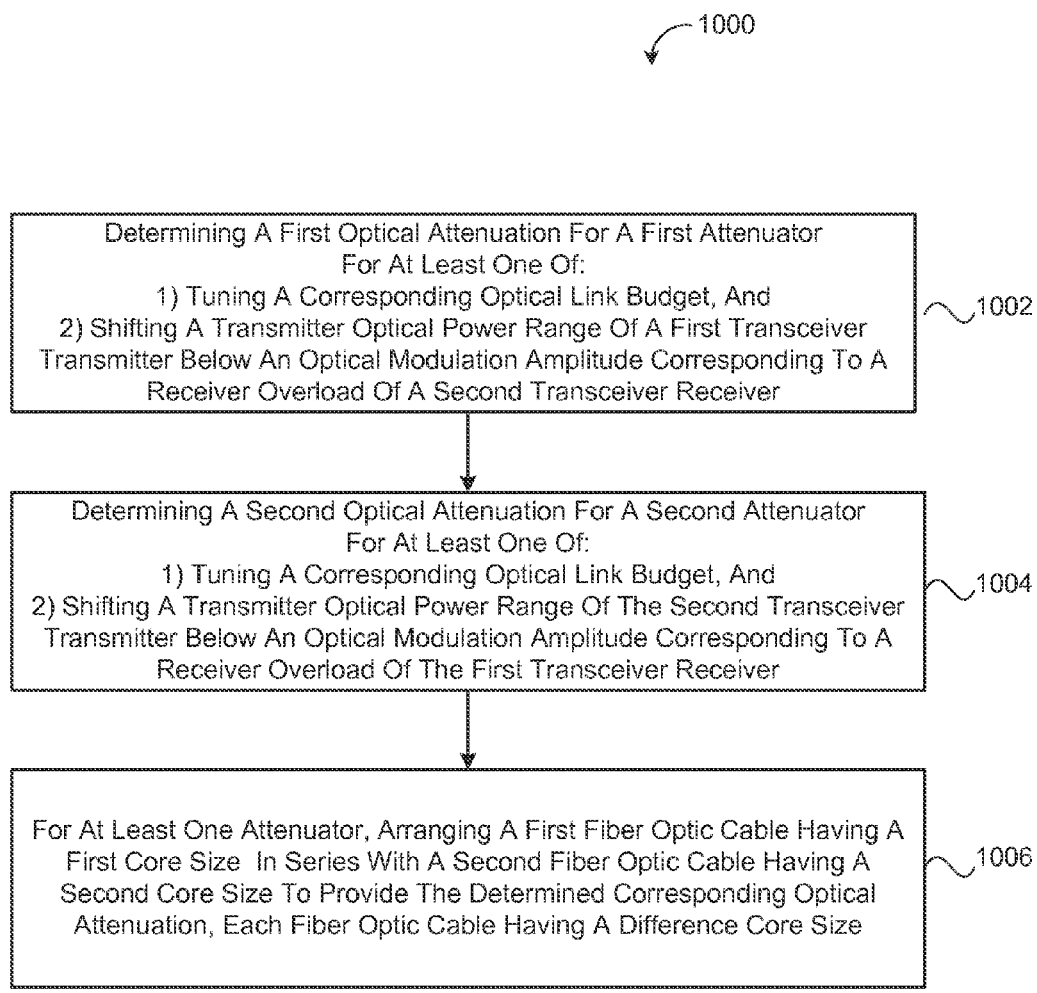
FIG. 10 provides an exemplary arrangement of operations a method of attenuating an optical signal between first and second transceivers.

FIG. 10 provides an exemplary arrangement 1000 of operations for a method of attenuating an optical signal between first and second transceivers 200a, 200b. The method includes determining 1002 a first optical attenuation $OA_1$ for a first attenuator 110 and determining 1004 a second optical attenuation $OA_2$ for a second attenuator 120. The first attenuator 110 receives an optical signal emitted by a transmitter 210a of a first transceiver 200a and delivers the received optical signal to a receiver 220b of a second transceiver 200b.

The first optical attenuation $OA_1$ is determined to: 1) shift a transmitter optical power range of the first transceiver transmitter 210a below a threshold power (e.g., below an optical modulation amplitude or average optical power) corresponding to a receiver overload of the second transceiver receiver 220b and/or 2) tune a corresponding optical link budget.

The second optical attenuation $OA_2$ is determined to: 1) shift a transmitter optical power range of the first transceiver transmitter 210a below a threshold power (e.g., below an optical modulation amplitude or average optical power) corresponding to a receiver overload of the second transceiver receiver 220b and/or 2) tune a corresponding optical link budget.

In some implementations, for at least one attenuator 110, 120, the method includes arranging 1006 a first fiber optic cable 130a in series with a second fiber optic cable 130b to provide the determined corresponding optical attenuation $OA_1$, $OA_2$. Each fiber optic cable 130, 130a, 130b has a difference core size. Moreover, the first and second attenuators 110, 120 may provide different optical attenuations of the corresponding received optical signals. In some examples, each optical attenuation $OA_1$, $OA_2$ is chosen to shift the corresponding transmitter optical power range by a threshold power or threshold optical modulation amplitude difference that maintains a positive optical link budget.

In some implementations, for at least one attenuator 110, 120, the method includes arranging the first fiber optic cable 130a to receive light emitted from the corresponding transmitter 210a, 210b and arranging the second fiber optic cable 130b having a second core size larger or smaller than the first core size to receive at least some light propagated by the first fiber optic cable 130a for propagation to the corresponding receiver 220a, 220b. The optical attenuation OA may be determined using equation 3.

For at least one attenuator 110, 120, the method may include arranging the first fiber optic cable 130a to collect light emitted from the corresponding transmitter 210 and arranging the second fiber optic cable 130b, having a second core size smatter than the first core size of the transmitter 210, to receive at least some light propagated by the first fiber optic cable 130a for propagation to the corresponding receiver 220. The method may include arranging the second fiber optic cable 130b to receive a fraction of the light propagated by the first fiber optic cable 130a for propagation to the receiver 220.

Additionally or alternatively, for at least one attenuator 110, 120, the method may include arranging the first fiber optic cable 130a to collect light emitted from the corresponding transmitter 210 and arranging the second fiber optic cable 130b, having a second core size larger than the first core size of the transmitter 210, to collect the light propagated by the first fiber optic cable 130a for propagation to the corresponding receiver 220.

A number of implementations have been described. Nevertheless, it will be understood that various modifications may be made without departing from the spirit and scope of the disclosure. Accordingly, other implementations are within the scope of the following claims.

What is claimed is:

1. An optical attenuation system comprising:
a first attenuator receiving an optical signal emitted by a transmitter of a first transceiver and delivering the received optical signal to a receiver of a second transceiver; and
a second attenuator receiving an optical signal emitted by a transmitter of the second transceiver and delivering the received optical signal to a receiver of the first transceiver;
wherein the first and second attenuators provide different attenuations of the corresponding received optical signals, wherein at least one attenuator provides an attenuation that prevents receiver saturation by shifting a transmitter optical power range of the corresponding transmitter below an optical modulation amplitude corresponding to a receiver overload of the corresponding receiver, at least one attenuator comprises at least two fiber optic cables having different core sizes arranged in series to provide the attenuation that prevents receiver saturation.

2. The optical attenuation system of claim 1, wherein at least one of the attenuators provides an attenuation that tunes an optical link budget.

3. The optical attenuation system of claim 2, wherein at least one attenuator comprises at least two fiber optic cables having different core sizes arranged in series to provide the attenuation that tunes the optical link budget.

4. The optical attenuation system of claim 3, wherein the attenuation shifts the transmitter optical power range by a threshold power difference that maintains a positive optical link budget.

5. The optical attenuation system of claim 1, wherein at least one attenuator comprises:
a first fiber optic cable having a first core size and arranged to receive light emitted from the corresponding transmitter; and
a second fiber optic cable having a second core size smaller than the first core size and arranged to receive at least some light propagated by the first fiber optic cable for propagation to the corresponding receiver.

6. The optical attenuation system of claim 5, wherein the second fiber optic cable receives a fraction of the light propagated by the first fiber optic cable.

7. The optical attenuation system of claim 5, wherein the at least one optical attenuator provides an optical attenuation OA, where $$OA = 10 \times \log_{10}\left(\frac{a^2}{b^2}\right)$$

and where a is the first fiber optic cable core size and b is the second fiber optic cable core size.

8. The optical attenuation system of claim 1, wherein the at least one attenuator comprises:

a first fiber optic cable having a first core size and arranged to receive light emitted from the corresponding transmitter; and a second fiber optic cable having a second core size larger than the first core size and arranged to receive the light propagated by the first fiber optic cable for propagation to the corresponding receiver.

9. A method of optical attenuation, the method comprising:

determining a first attenuation for a first attenuator receiving an optical signal emitted by a transmitter of a first transceiver and delivering the received optical signal to a receiver of a second transceiver;

determining a second attenuation for a second attenuator receiving an optical signal emitted by a transmitter of the second transceiver and delivering the received optical signal to a receiver of the first transceiver; and arranging at least two fiber optic cables having different core sizes in series to provide at least one of the determined attenuations.

10. The method of claim 9, further comprising determining at least one of the attenuations to prevent receiver saturation by shifting a transmitter optical power range of a corresponding transmitter below an optical modulation amplitude corresponding to a receiver overload of a receiver receiving an optical signal emitted by the transmitter.

11. The method of claim 10, further comprising arranging at least two fiber optic cables having different core sizes in series to provide the attenuation that prevents receiver saturation.

12. The method of claim 9, further comprising determining at least one of the attenuations to tune an optical link budget.

13. The method of claim 12, further comprising arranging at least two fiber optic cables having different core sizes in series to provide the attenuation that tunes the optical link budget.

14. The method of claim 13, further comprising determining the optical attenuation to shift the transmitter optical power range by a threshold power difference that maintains a positive optical link budget.

15. The method of claim 9, further comprising:

arranging a first fiber optic cable having a first core size to receive light emitted from the transmitter; and arranging a second fiber optic cable having a second core size smaller than the first core size to receive at least some light propagated by the first fiber optic cable for propagation to the receiver.

16. The method of claim 15, further comprising arranging the second fiber optic cable to receive a fraction of the light propagated by the first fiber optic cable for propagation to the receiver.

17. The method of claim 9, further comprising:

arranging a first fiber optic cable having a first core size to receive light emitted from the transmitter; and arranging a second fiber optic cable having a second core size larger than the first core size to receive the light propagated by the first fiber optic cable for propagation to the receiver.

18. The method of claim 9, further comprising determining the optical attenuation OA using the following formula $$OA = 10 \times \log_{10}\left(\frac{a^2}{b^2}\right)$$

where a is the first fiber optic cable core size and b is the second fiber optic cable core size.

19. A method of optical attenuation, the method comprising:

determining a first optical attenuation for a first attenuator, the first attenuator receiving an optical signal emitted by a transmitter of a first transceiver and delivering the received optical signal to a receiver of a second transceiver, the first optical attenuation determined for at least one of tuning a corresponding optical link budget and shifting a transmitter optical power range of the first transceiver transmitter below an optical modulation amplitude corresponding to a receiver overload of the second transceiver receiver;

determining a second optical attenuation for a second attenuator, the second attenuator receiving an optical signal emitted by a transmitter of the second transceiver and delivering the received optical signal to a receiver of the first transceiver, the second optical attenuation determined for at least one of tuning a corresponding optical link budget and shifting a transmitter optical power range of the second transceiver transmitter below an optical modulation amplitude corresponding to a receiver overload of the first transceiver receiver; and for at least one attenuator, arranging a first fiber optic cable having a first core size in series with a second fiber optic cable having a second core size to provide the determined corresponding optical attenuation, each fiber optic cable having a difference core size;

wherein the first and second attenuators provide different optical attenuations of the corresponding received optical signals.

20. The method of claim 19, further comprising determining at least one optical attenuation to shift the corresponding transmitter optical power range by a threshold power difference that maintains a positive optical link budget.

21. The method of claim 19, further comprising for at least one attenuator:

arranging the first fiber optic cable to receive light emitted from the corresponding transmitter; and arranging the second fiber optic cable having a second core size smaller than the first core size to receive at least some light propagated by the first fiber optic cable for propagation to the corresponding receiver.

22. The method of claim 21, further comprising arranging the second fiber optic cable to receive a fraction of the light propagated by the first fiber optic cable for propagation to the receiver.

23. The method of claim 21, further comprising determining the optical attenuation OA using the following formula $$OA = 10 \times \log_{10}\left(\frac{a^2}{b^2}\right)$$

where a is the first fiber optic cable core size and b is the second fiber optic cable core size.

24. The method of claim 19, further comprising for at least one attenuator:

arranging the first fiber optic cable to receive light emitted from the corresponding transmitter; and arranging the second fiber optic cable having a second core size larger than the first core size to receive the light propagated by the first fiber optic cable for propagation to the corresponding receiver.

* * * * *